(No Model.)
P. D. CRULL.
BOOT AND SHOE JACK.
No. 287,100. Patented Oct. 23, 1883.
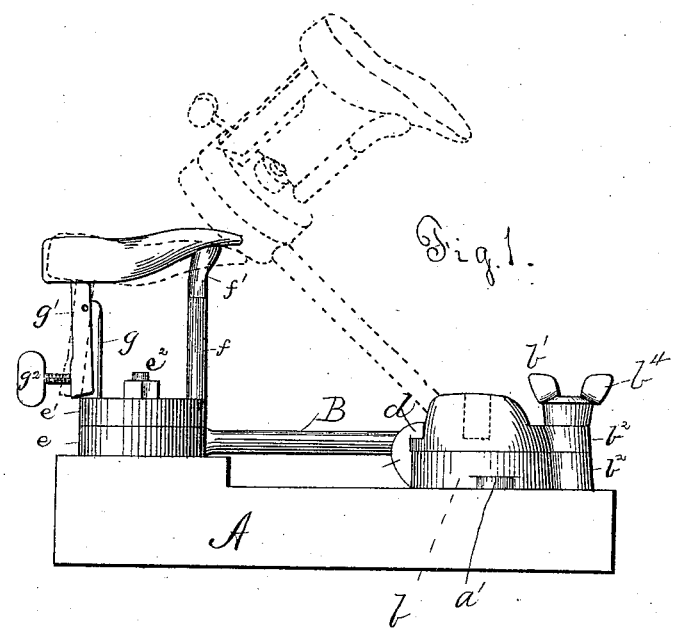
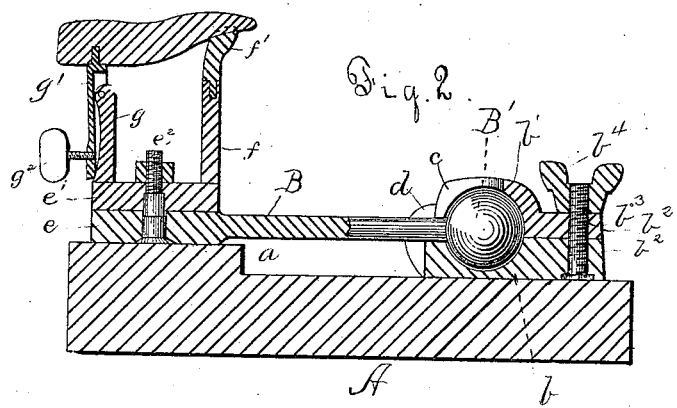
Attest
N. A. Clark
R. B. ...
Inventor
Peter D. Crull
By R. S. & A. P. Lacey
Attys.

UNITED STATES PATENT OFFICE.

PETER D. CRULL, OF ROODHOUSE, ILLINOIS, ASSIGNOR TO EMILY B. CRULL, OF SAME PLACE.

BOOT AND SHOE JACK.

SPECIFICATION forming part of Letters Patent No. 287,100, dated October 23, 1883.

Application filed March 31, 1883. (No model.)

*To all whom it may concern:*

Be it known that I, PETER D. CRULL, a citizen of the United States, residing at Roodhouse, in the county of Greene and State of Illinois, have invented certain new and useful Improvements in Boot and Shoe Jacks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to improvements in boot and shoe jacks, and has for its object facility of operation and convenience in manipulating the material being operated upon.

The invention consists of the combinations and arrangements of parts substantially as hereinafter fully set forth and claimed.

In the accompanying drawings, Figure 1 is a side view of my improved machine. Fig. 2 is a sectional elevation of the same, partly in side view.

A is a support or base, upon which the several parts are mounted, and which is constructed with an elevation, $a$, at one end.

B is a rod or arm, with a ball or spherical shoulder, B′, formed on one end, which is adapted to fit in a corresponding socket, said socket being formed of a plate, $b$, fastened at $a'$ to the base A, and made with a concavity or hemispherical socket, and of a correspondingly-socketed plate, $b'$, fitted upon and secured to the plate $b$. The spherical socket for the ball of the rod or arm has in its front and top a continuous slot or opening, $c$, to permit the arm or rod B to rest either in a horizontal position or be adjusted in the arc of a circle vertically, as indicated in dotted lines in Fig. 1, while, by means of the ball and socket, it is capable of a horizontal, rotary, or rocking movement, whereby facility and convenience in the adjustment of the last, presently described, are effected. The upper plate, $b'$, together with the lower plate, $b$, is formed with an ear, $b^2$, through which is passed a bolt, $b^3$, having a thumb-nut, $b^4$, said bolt also having an angular shouldered lower end, and said shoulder or lower end resting or fitting in a corresponding recess or countersink made in the lower side of the plate $b$, to prevent the screw or bolt from turning as the nut is manipulated. The screw and nut $b^3$ $b^4$ serve to secure the arm in its dotted-line elevated position of Fig. 1. The front part of the lower plate, $b$, is provided with upwardly-projecting hooks or clamps $d$, which fit upon shoulders $d'$, formed upon the top plate, $b'$, one being arranged on each side of the slot $c$, to fasten the plates together at that side. The opposite end of the arm B is provided with a disk, $e$, (preferably formed therewith,) which is adapted to rest upon the elevation $a$ of the base A, and to which is connected, so as to turn thereon, a similar disk, $e'$, by means of a spindle or shaft, $e^2$, with a nut fitted on its upper screw-threaded end and securing the upper disk in position. At the front upper side of the disk $e'$ is a standard, $f$, and at the rear upper side of the said disk is a similar standard, $g$, the front standard having a swiveled toe holding or supporting bar $f$ for the last, and the rear standard having a pivoted bar or lever, $g'$, upon which the last is held near its heel portion. The lever $g'$ is provided with a thumb-adjusting screw, $g^2$, to enable the forcing of the toe of the last firmly down upon the support $f'$ of the standard $f$, while, by means of the swiveled or turning disk $e'$, either the toe or heel of the last may be turned toward or next to the operator, as may be desired. It is also remarked that the upper socket-plate, $b'$, may be provided with a slot at right angles to the slot $c$, to allow the arm with the last to be turned around in that position for greater convenience in trimming and pegging or sewing the leather on the last.

Having thus fully described my invention, I claim and desire to secure by Letters Patent—

The pegging-jack, substantially as described and shown, composed of the base A, provided at one end with the elevation $a$, the ball-socket $b$, secured on the opposite end of the base, and formed with a vertical slot, c, opening toward the elevation a, the arm B, provided at one end with ball B', secured within socket b, and at its other end the plate e, and the turn-table pivoted and rotating on the plate e, and provided with means to hold the last, substantially as described, and for the purposes specified.

In testimony whereof I affix my signature in presence of two witnesses.

PETER D. CRULL.

Witnesses:
B. J. MORROW,
J. W. ROODHOUSE.